United States Patent [19]
Wakerly

[11] Patent Number: 5,875,466
[45] Date of Patent: Feb. 23, 1999

[54] ACTIVE CACHE FOR A MICROPROCESSOR

[75] Inventor: John F. Wakerly, Mountain View, Calif.

[73] Assignee: Alantec Corporation, Warrendale, Pa.

[21] Appl. No.: 799,636

[22] Filed: Feb. 28, 1997

Related U.S. Application Data

[63] Continuation of Ser. No. 489,411, Jun. 9, 1995, Pat. No. 5,608,892.

[51] Int. Cl.$^6$ .................................................. G06F 12/00
[52] U.S. Cl. .......................... 711/138; 711/159; 711/203; 711/118
[58] Field of Search ................ 711/3, 118, 133, 711/138, 154, 159, 203

[56] References Cited

U.S. PATENT DOCUMENTS

| | | | |
|---|---|---|---|
| 5,237,670 | 8/1993 | Wakerly | 395/280 |
| 5,515,376 | 5/1996 | Murthy et al. | 370/402 |
| 5,608,892 | 3/1997 | Wakerly | 711/118 |

OTHER PUBLICATIONS

Integrated Device Technology, Inc., "The IDTR3051™, R3052™ RISController™ Hardware User's Manual", Revision 1.3, Aug. 21, 1992, pp. 6–1 through 8–10.
Wakerly, Digital Design Principles and Practices (Prentice Hall 1994 2nd ed.), pp. 640–650.
IDT79R3051 Family Hardware User's Manual, Integrated Device Technology, Inc., 1990, pp. 6–1 through 8–10.
Kane, MIPS RISC Architecture (Prentice–Hall 1988).

*Primary Examiner*—David L. Robertson
*Attorney, Agent, or Firm*—Skjerven, Morrill, MacPherson, Franklin & Friel LLP; Michael Shenker

[57] ABSTRACT

An active cache memory for use with microprocessors is disclosed. The cache is external to the microprocessor and forms a second level cache which is novel in that it is capable of performing transfers from external random access memory independently of the encache misaligned references and to transfer data to the microprocessor in bursts.

57 Claims, 4 Drawing Sheets

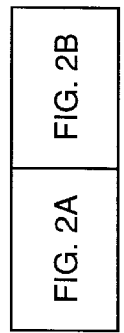

ACTIVE CACHE FOR A MICROPROCESSOR

This application is a continuation of application Ser. No. 08/489,411, filed Jun. 9, 1995, now U.S. Pat. No. 5,608,892.

BACKGROUND OF THE INVENTION

The present invention is related to memory systems attached to computer central processing units, and in particular to memory systems attached to central processing units of microprocessors in a shared memory configuration.

Conventional microprocessors access random access memory through address and data buses and control signals. Some microprocessors use a common address/data bus which is time-multiplexed.

When the microprocessor CPU (central processing unit) reads data (which may include instructions) stored in the memory by performing a read operation, the microprocessor typically places an address on the microprocessor address bus (or common address/data bus) and requests a "read" operation via the control signals. Similarly, when the microprocessor writes data to the memory it typically first places an address on its address bus, and requests a "write" operation via its control signals. During subsequent steps of the write operation, the CPU places the data to be written on its data bus (or on the address/data bus in the case of a time-multiplexed address/data bus).

A cache is a small, fast memory logically located between the random access memory and the microprocessor CPU. A cache accelerates reads to the memory by holding the most recently accessed data.

The cache memory is not a random access memory, but rather an associative memory. When presented with an address and data as a result of a microprocessor write operation, the cache associates the address with the data and stores the data in its memory. When presented with an address as the result of a microprocessor read operation, the cache inspects the address to determine whether or not the cache has stored data associated with the address. If such an association exists, the cache "hits" and the data is presented to the microprocessor with no interaction on the part of the random access memory. Alternatively, if no such association exists, the cache "misses" and the random access memory must be read to fill the cache and to deliver the requested data to the microprocessor.

In the case of a cache miss, caches cause the microprocessor to stall the existing program flow and to perform a cache fill procedure to bring the requested data into the cache. This degrades the overall performance of the program.

For high performance applications, it is desirable to have as much data encached as possible. However, a problem exists when multiple microprocessors and other devices are allowed to read and write to the random access memory which is a shared memory (SM). It is possible that two or more devices use information stored in the same location in the shared memory. In such a case, it is important that all devices use this information consistently.

For example, it is possible that one microprocessor can encache a portion of the shared memory in its cache, and subsequently a second microprocessor or other device can overwrite the same location in the shared memory. The first microprocessor must be made aware that its encached copy of the shared memory data is no longer valid, since the data has been modified by another device. This is called the "cache consistency problem."

The shared memory is often used by two or more microprocessors or other processing engines to communicate with each other. An example of such a system is described in U.S. patent application Ser. No. 08/093,397, "Communication Apparatus and Methods, now U.S. Pat. No. 5,575,376, issued on May 7, 1996. " In this system, multiple microprocessors and network controllers communicate through a shared memory for the purpose of forwarding packets of information between networks. A network controller writes the packet into a buffer in the shared memory, and writes control information associated with the packet into a descriptor in the shared memory. A microprocessor reads this information in order to process the packet. The network controller writes the information associated with a particular packet only once; therefore, once the writing has been completed, the microprocessor may read and encache this information. However, the network controller may use the same region of the shared memory later to store information for a new packet. At this point, the information stored in the microprocessor's cache is inconsistent with what has been written into the shared memory. The microprocessor must somehow be made to ignore what is stored in its cache and instead to read the new information from the shared memory.

One solution to the cache consistency problem is simply not to encache shared information in the first place. For example, the MIPS R3000 family microprocessor architecture [ref. MIPS RISC Architecture, by Gerry Kane, Prentice-Hall, 1988, hereby incorporated herein by reference] specifies certain portions of memory to be cacheable, and other portions to be uncacheable, as indicated by certain high-order bits in the microprocessor's internal, virtual address. In systems employing this microprocessor, shared information may be accessed via non-cacheable virtual addresses. However, this solution reduces performance for two reasons, discussed below.

First, a particular piece of shared information may be used multiple times by the program, for example, a packet header may be looked at several times by different steps in the packet-forwarding algorithm. Since this piece of information is not cached, it must be read from the shared memory once for each step, which is inefficient. This inefficiency may be partially overcome by explicitly reading the information only once and then storing it in a processor register or in non-shared, and therefore cacheable, memory. However, when written in a high-level-language program, these explicit operations may or may not be preserved by the high-level-language compiler. For example, the compiler may decide that these operations are redundant and remove them, leading to incorrect program operation.

Second, accesses to non-cacheable memory may not use the most efficient mode of microprocessor bus operation. For example, some MIPS R3000-family microprocessors, such as the R3052 and R3081 from Integrated Device Technology, Inc., use an efficient 4-word burst mode to read cacheable memory locations, but use a less efficient single-word mode to read noncacheable locations.

Another solution to the cache inconsistency problem is to allow programs to encache shared information once, but then to explicitly flush (mark invalid) the cached information after it has been used. This guarantees that the cache will "miss" when the processor next attempts to read new information at a shared memory location that was previously encached. Disadvantages of this approach include program inefficiency (extra instructions are needed to flush the cache) and awkwardness (a high-level language may not be able to generate the low-level instructions needed to flush the cache).

Another solution to the cache inconsistency problem is called bus snooping. In the bus-snooping method, each microprocessor which shares the memory monitors all other microprocessors to detect memory write operations to locations which the microprocessor has encached. If any other microprocessor performs a write to an encached location, the first microprocessor invalidates its cache so that the next read reference to that location will cause a cache miss.

Bus snooping has the disadvantage of requiring additional bus-snooping and cache-monitoring logic to be present in each microprocessor, which can increase the cost and/or decrease the performance of the microprocessor. Also, bus snooping may not be supported at all by some classes of commercially available non-microprocessor devices, such as the network controllers mentioned previously.

SUMMARY

The present invention alleviates the above problems by allowing a given block of shared information to be read from the shared memory exactly once, by using efficient burst-mode transfers of this information to the microprocessor, and by automatically forcing a cache miss when new information is read. These results are obtained without the use of explicit copying from non-cacheable to cacheable memory, low-level cache-flushing operations, or bus-snooping hardware.

In many applications of shared memory with multiple microprocessors, cache inconsistency exists not because one microprocessor modifies the exact word that another microprocessor reads, but rather that the microprocessor caches entire blocks of memory, or cache lines, and a cache line contains both a word modified by one microprocessor and a different word read by another microprocessor. In other words, sometimes cache inconsistency exists because the microprocessor cache encaches at the cache line granularity, rather than at less than cache line granularity.

The present invention alleviates this problem by allowing only those portions of the shared memory that are actually utilized by each microprocessor to become encached in its corresponding active cache.

A memory access acceleration method commonly used in microprocessors is burst-mode block reads and writes. Burst mode allows blocks of information to be transferred to and from the microprocessor at the full rate of the memory system attached. A block is a physically contiguous, multiple word quantity of memory, located on a physical address boundary which is specific to the memory subsystem and the microprocessor. Burst-mode read or write is possible when the microprocessor is able to make a single, aligned, multiple-word request to the memory subsystem.

A microprocessor and a shared memory subsystem may use different clock frequencies for their operation, so that each may operate at a speed that is most advantageous according to design goals of cost, performance, individual component speeds, and so on. When different, asynchronous clocks are used for a microprocessor and memory, a performance penalty normally occurs as control signals and data are synchronized from one clock domain to the other. [For example, see Digital Design Principles and Practices, 2nd ed. (Prentice Hall, 1994), by John F. Wakerly, pp. 640–650 hereby incorporated herein by reference.] The present invention hides this penalty by bringing shared-memory data into the microprocessor's clock domain in advance, so that the microprocessor need not suffer a synchronization delay when reading shared-memory data.

Typical microprocessors often cannot perform burst operations to memory due to block misalignment reasons. The present invention allows unaligned blocks to be burst to the microprocessor.

In some embodiments, the present invention provides an "active" cache, that is, a cache that can encache data independently of the microprocessor, while the microprocessor executes other instructions. The active cache allows the microprocessor not to stall during the encache operation.

Sometimes a microprocessor cannot perform a burst read because a memory is too slow to be able to read data in burst mode at the speed required by the microprocessor. However, in some embodiments, the active cache of the invention is sufficiently fast to read data at the speed required by the microprocessor. Hence, even if the shared memory is not sufficiently fast to read data at the microprocessor burst mode speed, shared memory data can be encached and then read by the microprocessor from the cache in burst mode.

In computer networking applications, it is often desirable to compute a checksum on data that is read from a packet header by the microprocessor. The present invention allows such a checksum to be computed by the active cache as it is loaded into the active cache, thus relieving the microprocessor of this task.

The present invention provides in some embodiments shared memory caching without bus-snooping in an efficient manner.

The present invention provides in some embodiments cacheability of a random access memory at smaller granularity than the microprocessor cache line granularity.

The present invention provides in some embodiments an external cache which allows memory-mode bursts to a microprocessor on unaligned memory accesses.

The active cache of some embodiments of the present invention is connected to a microprocessor and to a shared memory as described in detail below. It should be understood that each microprocessor in the system utilizing the shared memory is connected to the memory and its own active cache in an identical manner. Each microprocessor may also have a private (non-shared) memory subsystem.

Although some embodiments include multiple microprocessors connected to a shared memory, in other embodiments the memory could be shared between a single microprocessor and, for instance, direct-memory access (DMA) devices, such as Local-Area-Network (LAN) controllers. For example, U.S. Pat. No. 5,237,670, "Method and Apparatus for Data Transfer Between Source and Destination Modules," hereby incorporated herein by reference, describes a shared memory that can be shared between multiple processors and LAN controllers, and previously referenced U.S. patent application Ser. No. 08/093,397, "Communication Apparatus and Methods," hereby incorporated herein by reference, now U.S. Pat. No. 5,515,376, issued on May 7, 1996, describes methods and data structures used by multiple processors and network controllers connected to such a shared memory.

In one embodiment, the typical memory operations of each microprocessor consist of reading a contiguous group of 1 to 16 words from a shared memory and operating on those words in the microprocessor. In this system, a word is a 32-bit quantity, a halfword is a 16-bit quantity, and a byte is an 8-bit quantity. The words read from the shared memory comprise a packet header describing a packet of information including a from-address, a to-address, a length, and other information.

The memory of the system is shared by multiple, identical microprocessor-and-active-cache combinations which access the memory in a round-robin or priority fashion as dictated by the needs of the application. Each microprocessor operates as follows.

The microprocessor determines the starting address of a packet header, HA, in the shared memory by reading a queue or descriptor ring of packet headers as described in previously referenced U.S. patent application Ser. No. 08/093,397, "Communication Apparatus and Methods." This application is now U.S. Pat. No. 5,515,376, issued on May 7, 1996. The microprocessor dequeues the packet for its use and marks the packet in-use. The microprocessor then accesses the appropriate packet header in the shared memory utilizing the present invention.

The microprocessor contains an internal data cache. The internal cache has the characteristic that it is physically (as opposed to virtually) tagged. That is, physical addresses are used to access the internal cache. However, programs executing in the microprocessor utilize virtual memory addresses to access data. These virtual memory addresses are automatically translated by the microprocessor into physical addresses and then applied to the internal cache to determine the presence or absence of the data in the internal cache. Virtual addresses in the microprocessor additionally have the property that the data at their corresponding physical addresses may be indicated as internally cacheable or non-cacheable, according to certain high-order bits of the virtual address. When a reference is made to an internally non-cacheable virtual memory address, the referenced physical memory is never internally cached.

The external active cache of some embodiments of the present invention uses a conventional memory-address decoding technique to map the active cache into the address space of the physical memory. The active cache is memory-mapped into a single distinct block of the physical address space of the microprocessor. This block space has no realization in the physical memory, so memory-mapped active-cache requests have no conflict with actual physical memory addresses.

The active cache decodes each microprocessor address using its request-reception circuit. For each microprocessor address, there are three possibilities:

(1) The memory access is not directed to the active cache or to the shared memory. In this case, the request-reception circuit ignores the request, allowing it to be handled elsewhere in the microprocessor's (private, non-shared) memory subsystem.

(2) The memory access is a direct request to the shared memory. In this case, the request-reception circuit passes the request to the shared memory. The access may utilize part of the active-cache circuit, but it does not change the state of the active cache memory.

(3) The memory access is an active-cache request. In this case, the active cache decodes the request and processes it as discussed next.

The two distinct virtual memory blocks into which the active cache is mapped are used to determine the basic operation of an active-cache request. Each of the virtual address blocks is mapped to the same physical address block, namely, the physical address block onto which the active cache is memory-mapped.

The first virtual block is dedicated to updating the active cache by requesting it to encache-data. This is accomplished by a single "write" operation by the microprocessor.

The second virtual block is dedicated to data-accessing requests to obtain data from the active cache. This is accomplished by one or more "read" operations by the microprocessor.

Two different virtual blocks are used so that the block corresponding to the encache-data request can be indicated as internally non-cacheable while the other block, dedicated to data accessing requests, can be indicated as internally encacheable. Using an internally non-cacheable block for the encache-data request has two benefits. First, internal cache space is not consumed as the result of an encache-data request. Second, the internal microprocessor cache in some embodiments may use a "write-back" discipline in which write data may initially be written only to the internal cache and not to the external bus. Using an internally non-cacheable block for the encache-data request in such an embodiment guarantees that the encache-data request will appear as soon as possible on the external bus.

Updating the active cache by requesting it to encache-data is described below. Addresses in active cache's physical-address block are decoded by the request-reception circuit in the active cache. A microprocessor write operation in this physical-address block indicates an encache-data request to the active cache. The details of the request are contained in the "write address" and the "write data" of the microprocessor write operation. The "write address" is selected within the virtual block dedicated to updating the cache in a way that ensures correct operation of the microprocessor's internal cache, as described later. The "write data" contains a word count and a physical base address for the shared-memory data to be encached.

The format of the write address and write data vary depending on the embodiment. For example, in some embodiments, two words are sometimes written to provide enough bits to specify the base address, the word count, and other details for an encache-data request.

In some embodiments, the encache-data request write address contains 32 bits (8 hexadecimal digits), formatted as shown below:

$A9ppsssy_{16}$ where:
 A9—indicates the non-cacheable, memory-mapped virtual address block
 pp—process id
 sss—miss optimization (don't care)
 y—indicates binary xx00 where xx is don't care In the microprocessor, hexadecimal virtual memory addresses of A9xxxxxx (where x is "don't care") are interpreted as being internally non-cacheable. Since these addresses are non-cacheable, the microprocessor places the physical address of the virtual block on its address bus, and the "write" command on its control bus. (In some embodiments, the microprocessor contains a "write buffer", and hence the request may be delayed). The physical address placed on the address bus by the microprocessor is not a memory address, but rather parameters used by the present invention as shown in the format of the address. The ppsss bits of the address are unused by the active cache and are only manipulated by the microprocessor software to ensure that previous active-cache updates which may be internally encached in the microprocessor will not be returned erroneously.

The write data contains 32 bits (8 hexadecimal digits), formatted as shown below:

$vwmmmmmm_{16}$ where:
 v—indicates binary xxxb where x is don't-care and b is the most-significant bit of the word count of the data to be read
 w—four least-significant bits of the word count of the data to be read mmmmmm—the 24-bit physical byte address of the memory data to be encached The above encache-data request is used in the present invention to cause the requested shared-memory data to be stored in the active cache memory. The memory address mmmmmm of the requested data may be unaligned with respect to 4-word boundaries, or any other boundaries, in the shared memory.

While the active cache is being updated in accordance with an encache-data request, a checksum is calculated by the active cache on the data read from the shared memory. The checksum is preserved in the active cache and may be read when a specific read-data request is performed.

In order to retrieve the data encached in the active cache, a protocol similar to the encache-request is employed, as described below.

An active-cache read request consists of a microprocessor memory read operation to the second specific virtual-memory block that is mapped into the physical address space of the active cache. The request-reception circuit of the active cache interprets microprocessor read operations to the active cache's physical-address block as requests to the active cache to deliver encached data.

The format of the read request address depends on the embodiment.

In some embodiments, the read request address contains 32 bits (8 hexadecimal digits), formatted as shown below:

$89\text{msssww}_{16}$ where:

- 89—indicates the cacheable, memory-mapped virtual address block
- m—determines whether the request is a data read ($1\text{xxx}_2$) or a checksum read ($0\text{xxx}_2$)
- sss—miss optimization (don't care)
- ww—indicates the byte address of the data to be read. The two low-order bits of ww are always 0, yielding a word address; and the two high-order bits of ww are ignored, leaving four bits that specify any one of 16 words In the microprocessor, the blocks whose hexadecimal virtual memory addresses are 89xxxxxx (where x is don't care) are marked as being internally cacheable. More particularly, the 11811 means internally cacheable, and the following "9" indicates an active cache request. The first read operation (and first read after write) by the microprocessor to the physical address block corresponding to the 89xxxxxx virtual address block will cause the microprocessor to place the physical address of the virtual block on its address bus, and the "read" command on its control bus.

In some embodiments, the physical address corresponding to the virtual address 8xxxxxxx is 0xxxxxxx. Thus, the address 09msssww will appear on the microprocessor address bus. In some embodiments, this read will cause any outstanding write operations in the write buffer to be forced to completion, or "flushed," as well.

The request-reception circuit of the active cache decodes read operations to the active cache's physical address block 09msssww as active-cache read requests. The active cache delivers to the microprocessor the data it previously encached, with no further shared-memory interaction.

Since the microprocessor's virtual address block corresponding to active-cache read requests is marked as internally cacheable, the microprocessor's internal cache may encache data that it reads from the active cache. Therefore, multiple microprocessor reads to the physical addresses of the data encached by the active cache of the present invention, subsequent to the first read after write, will "hit" in the internal microprocessor cache, reducing the access time for such subsequent read operations. The ppsss bits of the address are unused by the active cache and are only manipulated by the microprocessor software to ensure that data fetched by previous active-cache encache-data requests which may be internally encached in the microprocessor will not be returned erroneously. See the MICROPROCESSOR SOFTWARE OPERATIONS section below.

The active cache has the ability to return a checksum of the encached data, which it calculated in response to an encache-data request. When the m field in the address of the read-data request has its high order bit cleared and the ww field has a particular value ($\text{xx101100}_2$ in one embodiment), the active cache returns the checksum it has stored rather than the encached data. When the high order bit of the m field is set, the ww field determines the address of the encached data to be returned.

Each of the above virtual memory addresses is mapped by the microprocessor to the physical memory addresses $09\text{xxxxxx}_{16}$, where xxxxxx are the appropriate bits from the read or write request virtual addresses. The active cache monitors the microprocessor addresses for these physical addresses.

Other features and advantages of the invention are described below. The invention is defined by the appended claims.

DESCRIPTION OF THE PREFERRED EMBODIMENTS

Figure 1:
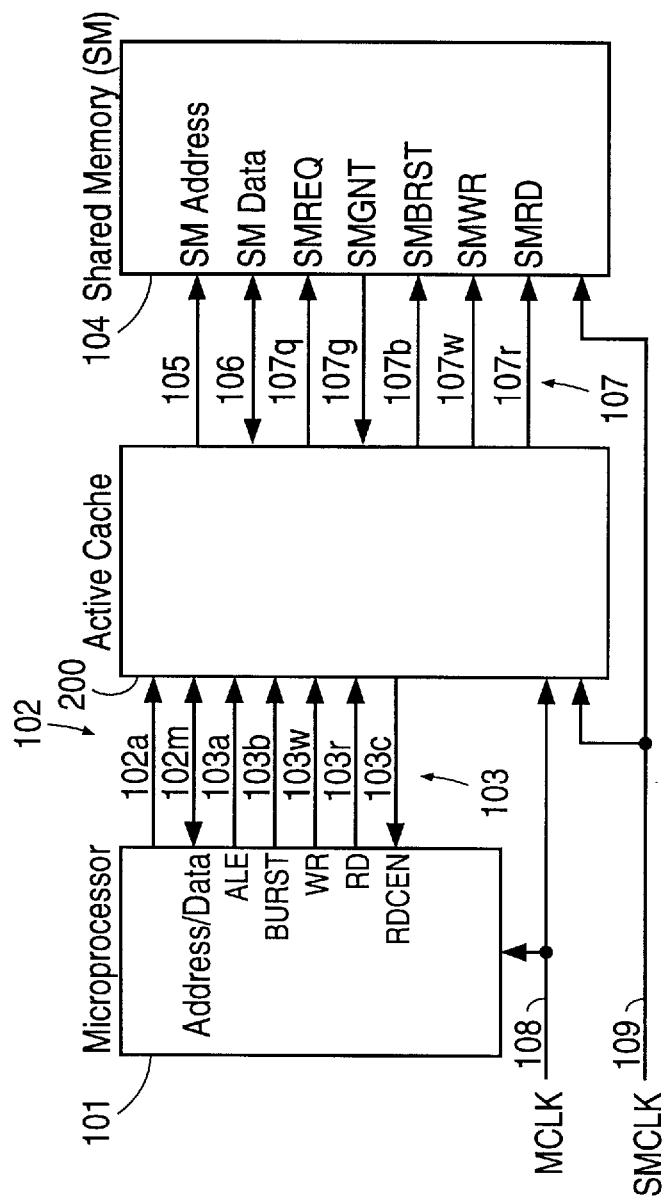
FIG. 1 depicts an active cache of the present invention attached to a shared memory and a microprocessor.

Referring to FIG. 1, microprocessor 101 is in some embodiments a microprocessor of type IDT79R3052 available from Integrated Device Technology, 2975 Stender Way, P.O. Box 58015, Santa Clara, Calif. 95052-8015. Microprocessor 101 is connected via address/data bus 102 and control lines 103 to cache 200.

The address/data bus 102 has two portions. The first portion is a multiplexed address/data bus 102m having 32 bits, [31. .0], which carry address information or data during different steps of a bus transaction. The second portion is a non-multiplexed address bus 102a having two bits, [3. .2], which carry address bits 3 and 2 throughout a bus transaction. During the address portion of a transaction, bits [31. .4] of bus 102m and bits [3. .2] of bus 102a carry the 30-bit word address. Bus 102a provides the least significant bits of the word address. Each word consists of 4 bytes. Bits [3. .0] of bus 102m carry byte enable information which includes the byte address within the word.

During the data portion of the transactions bits [31. .0] of bus 102m carry data. See "IDT79R3051 Family Hardware User's Manual", Integrated Device Technology, Inc., 1990, pp. 6–1 through 8–10, hereby incorporated herein by reference.

Cache 200 is connected to shared memory (SM) 104 via SM address bus 105, SM data bus 106, and SM control lines 107. The shared memory is used to store packet descriptor rings and packet buffers as well as packet statistics and other information that is shared by multiple microprocessors in some embodiments. See previously referenced U.S. Pat. No. 5,237,670, "Method and Apparatus for Data Transfer Between Source and Destination Modules," for an example of shared memory 104.

The microprocessor 101 and the shared memory 104 typically use clock signals to control their operation, as understood by those skilled in the art. In particular, the microprocessor 101 and the shared memory 104 may be controlled by different, asynchronous clocks, MCLK 108 and SMCLK 109. In this case, the active cache references microprocessor address/data bus 102 and control lines 103 to MCLK 108, while referencing SM address bus 105, SM data bus 106, and SM control lines 107 to SMCLK 109. In the discussion that follows, reference to the appropriate clock signal is implied.

In some embodiments, the system of FIG. 1 includes one or more other microprocessors and a separate active cache for each microprocessor. Each active cache is connected to a separate port of shared memory 104. Each port has lines similar to lines 105, 106, 107. In some embodiments, each microprocessor, or a group of microprocessors, is controlled by a separate clock.

The microprocessor reads or writes memory in two steps. In the first step, the memory address is placed on the address/data bus 102 and the address latch enable (ALE) control line 103a is asserted. In the second step, the read (RD) line 103r or the write (WR) line 103w is asserted, according to the type of access, and the address/data bus 102 is used to transfer data between the microprocessor and the memory.

Two of the address bits, [3. .2], are handled specially and are driven on non-multiplexed address bus 102a throughout both steps. The burst (BURST) line 103b may be asserted during a transaction to indicate that multiple data words are to be transferred, a block of 4 words in the case of the aforementioned IDT79R3052 microprocessor. Such a burst always begins on a 4-word boundary (address bits [3. .2] are initially 0), and the microprocessor increments address bits [3. .2] on non-multiplexed address bus 102a as each word is transferred.

The read clock enable (RDCEN) line 103c functions as a ready signal to indicate to the microprocessor when the memory has completed (or is about to complete) transferring each word of a transaction. Different microprocessors may define control signals to accomplish similar functions in a variety of ways, as understood by those skilled in the art.

To request access to the shared memory, the control circuit 209 asserts the request (SMREQ) line 107q. Control circuit 209 also indicates the type of access by asserting the read (SMRD) line 107r or the write (SMWR) line 107w. The shared memory 104 responds by asserting the grant (SMGNT) line 107g when the memory 104 is ready to transfer one word of data.

The control circuit 209 can request a burst transfer from the shared memory by asserting the burst (SMBRST) line 107b whenever cache 200 needs to transfer additional words beyond the one currently being requested. If during some period n of the clock SMCLK, SMREQ 107q is asserted and SMBRST 107b is not asserted, the shared memory 104 assumes a non-block transfer and ignores SMREQ 107q during the next period n+1 of clock SMCLK. The shared memory however does assert SMGNT 107g to grant the request made during the clock period n. If during a period n SMREQ 107q is asserted and SMBRST 107b is also asserted, the shared memory 104 will not ignore SMREQ 107b during clock period n+1. In either case, shared memory 104 asserts SMGNT 107g once for each 1-word access of cache 200 to the shared memory.

Some embodiments do not have SMBRST 107b.

Figure 2A:
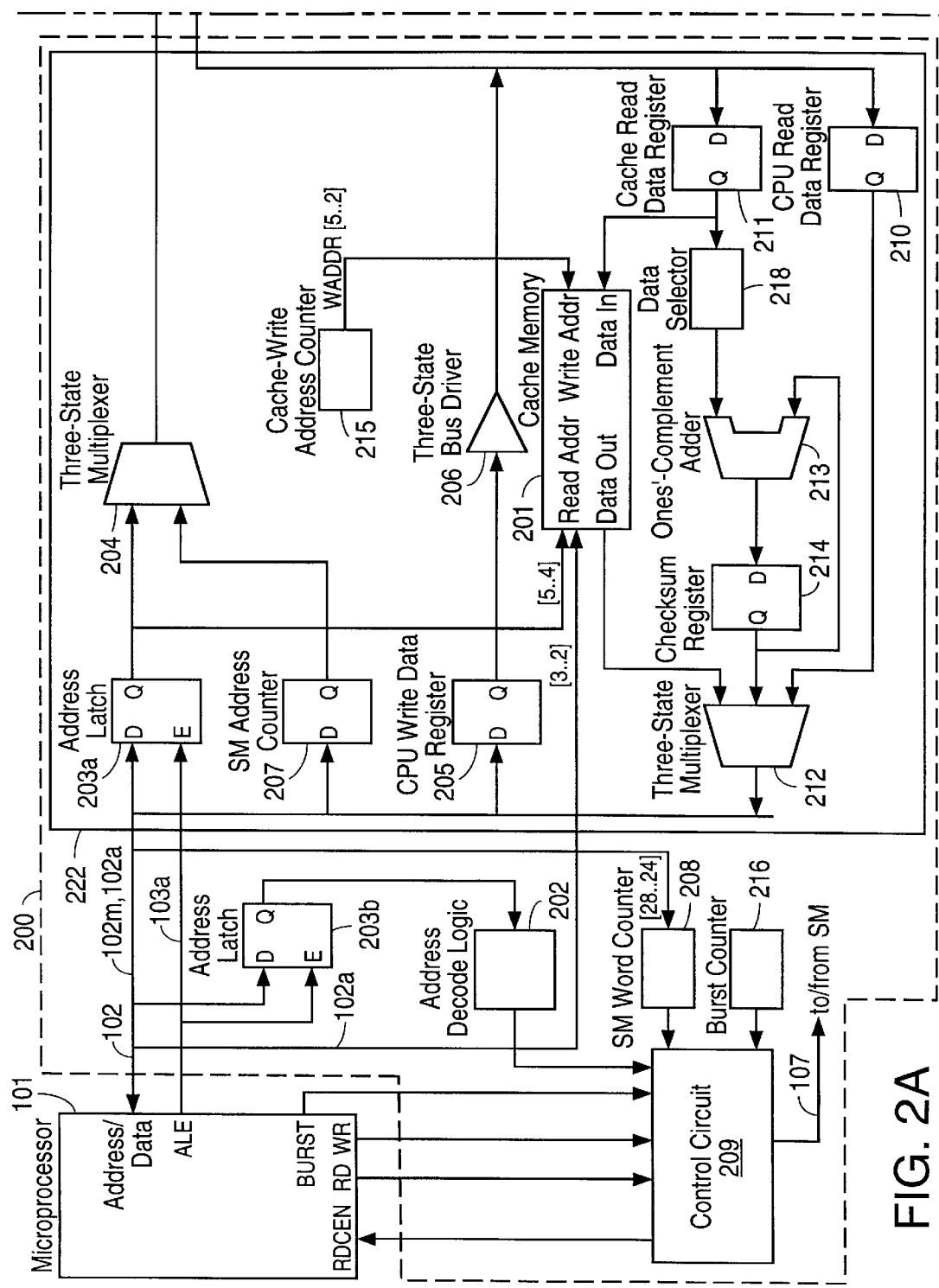
FIG. 2 illustrates the block structure of the active cache of FIG. 1.

FIG. 2 shows the active cache 200. Data is encached into and read from a cache memory 201, of conventional design in some embodiments. Memory 201 has a single read port and a single write port. Data is written by specifying an address using the Write Addr input, applying data to the Data In input, and asserting an appropriate write-enable input (not shown). Data is read by specifying an address using the Read Addr input; the specified data word appears at the Data Out output. In some embodiments, the cache memory 201 contains 16 32-bit words. In other embodiments, other sizes of memory are used with an appropriate adjustment in the sizes of addresses and data.

Control of the active cache 200 is provided by address latch 203b, address decode logic 202, SM word counter 208, cache-write address counter 215, burst counter 216, and a control circuit 209. In some embodiments, latch 203b, logic 202, counters 208 and 216, and circuit 209 are implemented using programmable logic devices (PLDs). In some embodiments, the data-path logic 222 which includes counter 215 is implemented in an application-specific integrated circuit (ASIC).

The control circuit 209 includes a state machine. Circuit 209 includes also an enabling circuit for enabling registers to be loaded and enabling counters to be reset, loaded, incremented, or decremented. Circuit 209 also includes a detection circuit to detect various conditions in the data path 222 and counters. The state machine moves from state to state in response to its current state and the inputs provided by the microprocessor 101, the shared memory 104, and the detection circuit. The enabling circuit controls the registers, counters, and other data-path elements as a function of the state machine's current state and inputs.

As understood by practitioners of the art, the active cache's circuit elements can be partitioned among PLDs, ASICs, and other digital logic components in a variety of other ways, as dictated by design flexibility, component availability and density, and cost, without changing the basic operation of the active cache described below.

Shared memory requests and active-cache requests are received by the active cache via the address/data bus 102 and control lines 103. The address is latched into address latches 203a and 203b when the microprocessor asserts its address latch enable ALE signal 103a. The two address latches 203a and 203b operate in tandem and each one latches all or a subset of the address bits on address/data bus 102 as required. Two latches are provided, with some address bits being duplicated, merely for convenience of grouping the circuit elements.

In some embodiments, address latch 203a latches all 32 address bits provided by the microprocessor 101 on multiplexed address/data bus 102m, and is packaged in an application-specific integrated circuit (ASIC) as part of the data-path logic 222, while address latch 203b is implemented in one or more external PLDs and captures only a few high-order address bits which are used by the address decode logic 202.

The active cache 200 monitors read and write requests from the microprocessor 101 using the address-decode logic 202 to decode addresses captured in the address latch 203b. A CPU write data register 205 captures the data from the microprocessor multiplexed address/data bus 102m during the second step of a data write operation. Together, elements 102, 103, 202, 203a, 203b, and 209 comprise the request-reception circuit.

Once a microprocessor request has been made, address decode logic 202 of the request-reception circuit decodes the 8 high-order bits of the address present in address latch 203b. Depending on the address, one of three outcomes is possible:

(1) The address does not select the active cache or the shared memory. In this case, the request-reception circuit ignores the request, allowing it to be handled elsewhere. Other devices, such as memory devices or memory-mapped I/O devices not shown in the drawings, may be selected by address-decode logic 202 and activated by conventional means, in which case the active cache and the shared memory are not involved. This case will not be discussed further.

(2) The address selects shared memory 104. In this case, the request-reception circuit passes the request to the shared memory, as discussed shortly.

(3) The address selects an active-cache request. In this case, the active cache employs the read and write lines 103r and 103w to further decode the request into one of two requests—an encache-data request or a read-data request—and processes the request as discussed later.

Shared-Memory Request Passthrough

The active cache is effectively bypassed for both read and write operations to the shared memory, as described below.

When the microprocessor address selects shared memory 104, the request is passed, with clock synchronization as required, through the active cache to the shared memory. The address of the shared-memory request is passed from the address latch 203a on to the shared-memory address bus 105 via a three-state multiplexer 204 controlled by control circuit 209. The output of multiplexer 204 is disabled at all times except during shared-memory request passthrough and active-cache encache-data requests, discussed later. Thus, other devices may access the shared memory when the three-state multiplexer 204 is disabled.

If the operation is a shared-memory write request, as determined by control circuit 209 via microprocessor control lines RD 103r and WR 103w, the data from the microprocessor is passed on to the shared memory via the CPU write data register 205, three-state bus driver 206, and shared-memory data bus 106. Note that the three-state bus-driver 206 has its output disabled at all times except during these shared-memory writes.

When the write operation is completed, the SM grant (ready) signal 107g from shared memory 104 is passed, after appropriate synchronization, to the microprocessor ready signal RDCEN 103c.

As will be understood by those skilled in the art, it is also possible to perform a "posted" write operation, in which RDCEN 103c is asserted and the microprocessor 101 is allowed to continue operation before the shared memory has written the data in CPU write data register 205 to the address specified in address latch 203a. In this case, additional elements are added to the system of FIG. 2 to ensure that the microprocessor does not overwrite the "posted" address and data before the write operation has actually completed.

If the operation is a shared-memory read request, then the three-state bus driver 206 is disabled, and the shared memory provides data and places it on shared-memory data bus 106. The control circuit 209 enables the CPU read data register 210 and three-state multiplexer 212 which controls the flow of the data onto the multiplexed address/data bus 102m. The grant (ready) signal 107g from shared memory 104 is passed, after appropriate synchronization, to the microprocessor ready signal RDCEN 103c.

Active-Cache Requests

In the cases where the microprocessor request is an active-cache request, as determined by address-decode logic 202 in the request-reception circuit, the active cache is used as described below. The active cache is designed in such a way that an encache-data request should precede any set of read-data requests. However this is not checked by the active cache, which may return stale or invalid data otherwise.

The active cache determines whether the microprocessor's request is an encache-data request or a read-data request by inspecting the microprocessor control lines 103.

Encache-Data Request

If an active-cache request is decoded by the address-decode logic 202 (bits [27. .24] of the address on bus 102m are 9), and if the microprocessor control lines 103 indicate a write, as determined by WR 103w being asserted, the request is an encache-data request. In this case, the control circuit 209 enables encache-data request parameters, provided in the "data" portion (vwmmmmmm$_{16}$, where v=xxxb$_2$) of the microprocessor write operation, to be captured.

Specifically, the control circuit 209 enables the SM address counter 207 to be loaded with the low-order 24 bits [23. .0] (mmmmmm$_{16}$) of the "data" provided on the multiplexed address/data bus 102m. This "data" is actually the starting address in SM of the data to be encached by the encache-data request. Note that although this memory address is a "byte" address, it should be aligned on a full-word boundary (i.e., the two low-order bits should be 0, since each word contains four bytes).

The address specified in data bits [23. .0] of encache-data request may be unaligned with respect to 4-word boundaries in the shared memory 104. As understood by those skilled in the art, with the addition of byte-alignment circuits (not shown), the address could also be unaligned with respect to 1-word boundaries.

The control circuit 209 also enables the SM word counter 208 to be loaded with bits [28. .24] (b$_2$w$_{16}$) of the "data" on multiplexed address/data bus 102m, which is the word count of the request. Note that this value counts full words, not bytes.

In some embodiments, the control circuit 209 also captures one or more of bits [31. .29] of the "data" on multiplexed address/data bus 102m, to control other aspects of the encache-data operation. For example, one or more of bits [31. .29] select a checksum pattern in some embodiments as discussed later.

At this time, the memory-control circuit 209 does not enable the three-state output of multiplexer 204 or bus driver 206, since the address from the microprocessor write operation is not used by the shared memory 104 and since the data is not used until later.

At this point, the physical memory address and the word count of the encache-data request have been captured in SM address counter 207 and SM word counter 208. The control circuit 209 signals the microprocessor 101 that the "write" operation is complete, thereby freeing the microprocessor to continue its program flow. Simultaneously, control circuit 209 resets the checksum register 214 to clear any residual data checksum, resets the cache-write address counter 215 to 0, and resets the burst counter 216 to 0. Finally, control circuit 209 changes a state bit or bits in its state machine to indicate that it is "BUSY" processing an encache-data request. The control circuit 209 is now responsible for completing the operation specified by the encache-data request, as follows.

In some embodiments, logic in the control circuit 209 determines at this time whether the low-order two bits of SM address counter 207 are 0 (the address is aligned on a full-word boundary). If they are not 0, the control circuit 209 aborts the encache-data operation and signals an error to the microprocessor 101.

The control circuit examines the output of SM word counter 208 to determine whether the word count is 4 words or greater. If true, the control circuit performs a 4-word burst read from the shared memory 104 independently of the microprocessor. To accomplish that, circuit 209 selects the SM address counter 207 as the source to multiplexer 204, enables the three-state output of multiplexer 204, and asserts the SMREQ 107q, SMBRST 107b, and SMRD 107r control lines to the shared memory. This indicates to the shared memory that the active cache would like to begin a burst read operation.

At the same time, the control circuit 209 sets up to receive burst data from the shared memory 104 and write the data into the cache memory 201. The shared-memory grant signal SMGNT 107g is asserted once for each word to be received from the shared memory. For each word, the control circuit 209 enables the cache read data register 211 to capture the word from the shared memory data bus 106 and write the word into the cache memory 201. The cache memory word at address specified by WADDR[5. .2] is written, where WADDR[5. .2] is the current value of the cache-write address counter 215.

At the same time that each word in the cache read data register 211 is written into the cache memory 201, the ones'-complement adder 213 may add all or part of this same data to the checksum register 214 to produce a running checksum, as explained later. For each word, the control circuit 209 also increments SM address counter 207 by 4 (to the next word address), decrements SM word counter 208 by 1 (one word), and increments the cache-write address counter 215 by 1 (one word). Thus, received words from the shared memory 104 are written into sequential locations in the cache memory 201.

In some embodiments, the shared memory has a structure similar to that disclosed in aforementioned U.S. Pat. No. 5,237,670, and one word is transferred from the shared memory 104 to the cache memory 201 each time that grant signal SMGNT 107g is asserted. The counters 207 and 208 are adjusted as described above at the end of the clock SMCLK period in which the grant signal 107g is asserted, while each data transfer occurs and the counter 215 is incremented during the following clock SMCLK period. Other embodiments increment or decrement one or more of the counters at different times relative to the actual data transfer, depending on the type and degree of pipelining employed. Also, other embodiments use a different form of the ready signal SMGNT, including but not limited to an SMGNT signal that is asserted once to indicate that all four words will be transferred in a single burst with no interruption.

In some embodiments in which SMGNT 107g is asserted once per 1 word transfer, after three assertions of the grant signal SMGNT 107g, the burst from shared memory is almost complete. At this time, the control circuit 209 negates the SMBRST signal 107b, indicating that the current request is for the last word of the burst.

After each assertion of the grant signal SMGNT 107g, indicating that one word from shared memory will be transferred, the control circuit 209 increments burst counter 216 to keep track of the number of words that have been written into the cache memory 201.

Upon completing a burst as described above, the control circuit 209 once again checks the SM word counter 208. If the word count is greater than or equal to 4, the control circuit 209 repeats the process just explained. If the word count is 0, then the encache-data request is complete. When the encache-data request is complete, the control circuit 209 changes the "BUSY" state bit(s) to indicate that the request is now complete.

When the control circuit 209 determines that the word count in SM word counter 208 is greater than 0 but less than 4 words, either as a result of an encache-data request of less than 4 words or the residual request from a non-multiple-of-4-words encache-data request, the active cache performs a word by word read from shared memory 104. This read is similar to the burst read from the shared memory described above, except that it may terminate early, as explained below.

If the value of the SM word counter 208 is 1, then a single-word read of shared memory is performed. This is accomplished in the same way as the 4-word burst explained previously, except that the SMBRST control line 107b to the shared memory is negated rather than asserted. The data read from the shared memory is stored in the cache memory 201 and possibly added to the checksum register 214 as before. The SM address counter 207 is incremented by 4, the cache-write address counter 215 is incremented by 1, and the SM word counter 208 is decremented by 1 and reaches its final count of 0. The encache-data request is therefore complete.

If the value of the SM word counter 208 is 2 or 3, in some embodiments a 4-word burst read of shared memory is performed. However, when the SM word counter 208 reaches 0, the control circuit 209 immediately changes the "BUSY" state bit(s) to indicate that the encache-data request is now complete. The remaining 1 or 2 words of the 4-word burst from shared memory are not stored in the cache memory 201, nor are they added to the checksum register 214.

A 4-word burst is performed above, even though only 2 or 3 words are needed, as a matter of convenience in the design of the shared-memory control circuit. Another embodiment performs a 2- or 3-word burst by negating the SMBRST control line 107b after receiving the first or second grant signal on SMGNT 107g. In yet another embodiment, the 2 or 3 reads are accomplished as 2 or 3 individual single-word reads in which the SMBRST control line 107b is not asserted for any of the reads. One of these alternative embodiments may be selected based on a trade-off between a possible increase in the complexity of the control circuit and a possible increase or decrease in the speed or efficiency with which a non-multiple-of-4-words transfer is accomplished.

Checksum Operations

As previously indicated, the checksum register 214 may accumulate a running checksum of all or some of the data that is written into the cache memory 201 as the result of an encache-data request. In some embodiments, the encached data is a packet header, and the checksum is the ones'-complement sum of selected halfwords of the packet header. These halfwords comprise the "IP header" field of the packet header, where "IP" (the Internet Protocol) is a well-known packet protocol that uses a ones'-complement checksum to detect errors in the packet header.

Depending on the packet's source, for example, an Ethernet network or an FDDI network, the IP header may appear in a different location relative to the beginning of the packet header. As a result the IP header may appear in a different position in the block of words that are written into the cache memory 201 as the result of an encache-data request. Also, since the IP header is defined as a certain number of halfwords, only half of a given word that is written into cache memory 201 may belong to the IP header.

The data selector 218 in FIG. 2 provides the active cache with the ability to selectively include or not include data words in the checksum accumulated by the checksum register 214. The data selector has two halves, one half for each of the two halfwords that make up the output of the cache read data register 211. For each halfword, there is a CKSME control input from control circuit 209, namely, CKSMEH for the high order halfword of the word and CKSMEL for the low order halfword. When a CKSME input is asserted, the data selector passes the corresponding halfword from the output of the cache read data register 211 to the input of the ones'-complement adder 213. When a CKSME input is negated, the data selector forces the corresponding halfword input of the ones'-complement adder 213 to zero, thus effectively eliminating that halfword from the checksum computation.

In other embodiments, the checksum pattern is established on a byte-by-byte basis, with the data selector 218 having four CKSME inputs, or on a full word basis, with the data selector 218 having only one CKSME input.

The selection of which halfwords are to be included in a checksum calculation is made by the control circuit 209. As each word is written into the cache memory 201, the control circuit 209 decodes the current value of the cache-write address counter 215, and asserts or negates CKSMEH and CKSMEL according to whether the corresponding halfword should be included in the checksum.

For example, in an IP packet received from an Ethernet network, the first seven halfwords of the packet header contain "MAC-layer" information, and the next ten halfwords contain the IP header. Table 1 shows the required values of CKSMEH and CKSMEL as a function of the cache-memory address. (In the table, "0" means negated and "1" means asserted.)

TABLE 1

Values of CKSMEH and CKSMEL for Ethernet IP headers.

| Cache-Memory Address | CKSMEH | CKSMEL |
|---|---|---|
| 0 | 0 | 0 |
| 1 | 0 | 0 |
| 2 | 0 | 0 |
| 3 | 0 | 1 |
| 4 | 1 | 1 |
| 5 | 1 | 1 |
| 6 | 1 | 1 |
| 7 | 1 | 1 |
| 8 | 1 | 0 |
| 9–15 | 0 | 0 |

On the other hand, in an IP packet received from an FDDI network, the first ten halfwords of the packet header contain "MAC-layer" information, and the next ten halfwords contain the IP header. Table 2 shows the required values of CKSMEH and CKSMEL.

TABLE 2

Values of CKSMEH and CKSMEL for FDDI IP headers.

| Cache-Memory Address | CKSMEH | CKSMEL |
|---|---|---|
| 0 | 0 | 0 |
| 1 | 0 | 0 |
| 2 | 0 | 0 |
| 3 | 0 | 0 |
| 4 | 0 | 0 |
| 5 | 1 | 1 |
| 6 | 1 | 1 |
| 7 | 1 | 1 |
| 8 | 1 | 1 |
| 9 | 1 | 1 |
| 10–15 | 0 | 0 |

When satisfying an encache-data request, the control circuit 209 in some embodiments selects the checksum pattern in Table 1 or the checksum pattern in Table 2 according to one of the encache-data-request parameter bits (bit 31 in some embodiments, that is, the most significant bit of v) that was provided in the data portion of the encache-data request, described previously. The program running on the microprocessor 101 sets or clears this bit according to the source, Ethernet or FDDI, of the packet whose header is being encached. In some embodiments, the control circuit 209 uses a single predetermined pattern that is not a function of the encache-data-request parameter bits.

In some embodiments using other checksum patterns, the control circuit 209 provides other patterns selected by additional encache-data-request parameter bits.

In some embodiments, the checksum pattern to be used may not be known at the time that the encache-data request is made. For example, the checksum pattern may be a function of information contained in the beginning portion of the packet header. In some embodiments, the control circuit 209 decodes information in one or more words in the beginning portion of the packet header as it is encached, and selects a checksum pattern based on such dynamically decoded information.

Other embodiments provide additional copies of the checksum circuit comprising elements 213, 214, and 218 in FIG. 2, a corresponding number of additional decoded sets of CKSME outputs from the control circuit 209, and a corresponding number of additional inputs on three-state multiplexer 212, so that additional, alternative checksums may be computed and any or all of these may be read by the microprocessor 101.

Some network protocols may use checksum operations other than ones'-complement addition, for example, two's-complement addition or a cyclic redundancy check (CRC) calculation. In such a case, the ones'-complement adder 213 is changed to an appropriate adder or other functional unit, and the control circuit 209 selects the appropriate adder or other functional unit according to the required checksum pattern.

Read-Data Request

An active-cache read-data request begins, like other memory operations, with the microprocessor 101 placing a memory address on address/data bus 102 and asserting the ALE signal, which causes the address to be captured by address latches 203a and 203b. If an active-cache request is decoded by the address-decode logic 202 and the microprocessor control lines 103 indicate a read, as determined by RD 103r being asserted, the request is a read-data request. In this case, the active cache is employed to deliver previously encached data. Again, it is assumed by the active cache that an encache-data request has preceded a read-data request, but this condition is not checked.

At this time, the control circuit does not enable the three-state output of multiplexer 204, since the address from the microprocessor read operation is not used by the shared memory 104. The bus driver 206 is not enabled, since data is not driven toward the shared memory by a read operation.

A logic circuit (not shown) attached to address latch 203b examines the high order bit 23. If this bit is 0 and the word address in the cache memory of the request is $1011_2$, the request is for the checksum in register 214. Otherwise, the request is for data in the cache memory 201.

The memory read address $09\text{mssww}_{16}$ captured in address latch 203a contains the word address in the cache memory 201 of the request in bits 5. .2. The length of the read-data request is determined by examining the BURST control line 103b from the microprocessor, and may be either 1 word or 4 words. If the BURST control line 103b is asserted, the read-data request is for 4 words of data. If the BURST control line 103b is negated, then the read-data request is for 1 word of data. The control circuit 209 determines the length of the request.

A data-read request of either length is satisfied as follows. Address bits [5. .4] from the address latch 203b and address bits [3. .2] received from the microprocessor on non-multiplexed address bus 102a are combined by the data path logic 222 to form a 4-bit address RADDR[5. .2]. This 4-bit address is applied to the read-address input of the cache memory 201 to select an encached word to be read. In response to the read-data request, the control circuit 209 selects the cache memory as the source for three-state multiplexer 212 and enables the three-state multiplexer 212 to drive the microprocessor address/data bus 102m. When the control circuit 209 determines (using a technique described later) that valid data has been encached into the selected location in the cache memory 201, control circuit 209 also asserts the RDCEN line 103c which serves as a ready line for the microprocessor 101. At this point, the microprocessor captures the data word on the address/data bus 102m. If a 4-word burst has been requested, the microprocessor 101 increments address bits [3. .2] on non-multiplexed address bus 102a to select the next word of the burst. If a 4-word burst has been requested, then the control circuit 209 repeats this process until each word of the 4-word burst has been read.

As noted previously, the address/data and control lines of the microprocessor 101 are referenced to a clock signal MCLK 108, while the SM address, data, and control lines are referenced to a clock signal SMCLK 109. If MCLK and SMCLK are the same clock, that is, if they have identical frequency and phase, then the control circuit 209 can control the RDCEN line 103c as follows. For each active-cache read operation, circuit 209 compares the 4-bit cache read address RADDR[5. .2] on bus 102 with WADDR[5. .2], the current value in the cache-write address counter 215. If RADDR[5. .2] is less than WADDR[5. .2], or if the "BUSY" state bit(s) indicate that the previous encache-data request is complete, then the RDCEN line 103c is asserted. Otherwise, the RDCEN line 103c is held negated until the write address WADDR[5. .2] becomes larger than the requested read address RADDR[5. .2] or the encache-data request is complete. Note that there is no checking to determine whether the read address is beyond the range requested by a given encache-data request. In some embodiments, the control circuit 209 signals an error to the microprocessor by conventional means, such as a bus error, in this case.

If MCLK and SMCLK are synchronized but have different frequency and/or phase (for example, SMCLK is derived from MCLK by a divide-by-2 circuit), then the control circuit 209 can control the RDCEN line 103c in a way similar to that described above. In particular, the decision to assert or negate RDCEN can be made one word at a time, but additional logic may be needed to adjust the timing of the comparison and control operations with respect to the two clocks.

Figure 3:
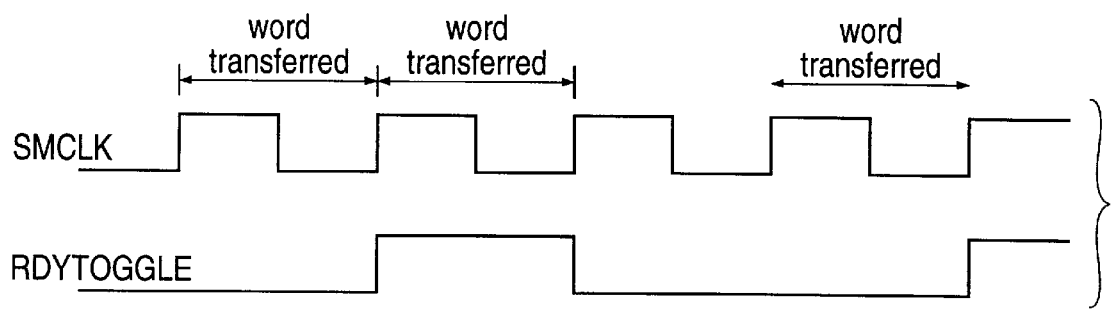
FIG. 3 illustrates timing diagrams of the system of FIG. 1.

In some embodiments, MCLK and SMCLK are completely asynchronous. In some such embodiments, MCLK has a higher frequency than SMCLK. Communication of "ready" information between the two clock domains is accomplished by a 1-bit control signal "RDYTOGGLE" diagrammed in FIG. 3. The control circuit 209 clears this signal at system reset, and toggles it (complements its value) once for each time that a word is transferred from the shared memory 104 to the cache memory 201. Toggling occurs on the rising edge of SMCLK, since the transfers are synchronized to the rising edge of SMCLK.

Figure 4:
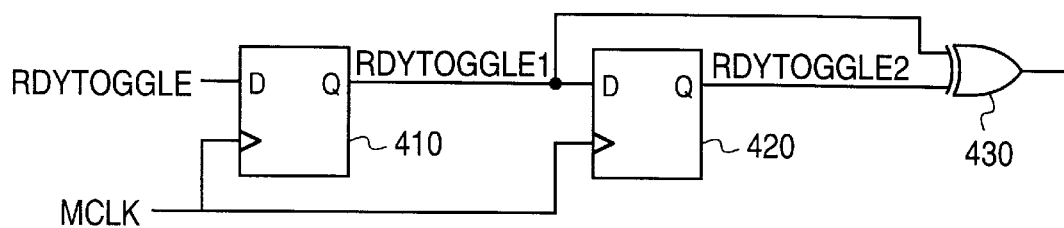
FIG. 4 is a block diagram of a circuit used in the system of FIG. 1.

The control circuit 209 also contains a flip-flop 410 (FIG. 4) which samples RDYTOGGLE using MCLK, that is, an edge-triggered flip-flop whose D input receives RDYTOGGLE and whose clock input receives MCLK and whose Q output is called RDYTOGGLE1. Since the MCLK's clock period is shorter than that of SMCLK, and changes on RDYTOGGLE must be separated by an integral number of SMCLK periods, all changes on RDYTOGGLE are guaranteed to be seen on RDYTOGGLE1. Although the RDYTOGGLE1 output may become metastable because of the asynchronous input change, it will with high probability be stable by the end of one MCLK period. For a metastability discussion, see, for example, Digital Design Principles and Practices, 2nd ed. (Prentice Hall, 1994), by John F. Wakerly, pp. 642–650 hereby incorporated herein by reference. The control circuit 209 contains a second edge-triggered flip-flop 420 whose D input receives RDYTOGGLE1 and whose clock input receives MCLK and whose Q output is called RDYTOGGLE2. RDYTOGGLE1 and RDYTOGGLE2 are XORed by XOR gate 430. If RDYTOGGLE1 and RDYTOGGLE2 have different values, as indicated by a "1" on the output of gate 430, then a change has been received on RDYTOGGLE, indicating that one word has been transferred from the shared memory 104 to the cache memory 201. This fact can be reliably observed on RDYTOGGLE1 and RDYTOGGLE2 in the MCLK clock domain, even though the transfer occurred in the SMCLK domain.

The burst counter 216 is used in conjunction with the above-described mechanism in some embodiments to keep track of how many words have been transferred from the shared memory 104 to the cache memory 201. The burst counter 216 is clocked by MCLK and, as mentioned previously, is reset to 0 by an encache-data request. At the end of each subsequent MCLK period in which RDYTOGGLE1 and RDYTOGGLE2 have different values, the burst counter 216 is incremented. In effect, the burst counter 216 "shadows" the value of the cache write-address counter 215, but in the MCLK rather than the SMCLK clock domain. Thus, RDCEN can be generated in a way similar to that previously described for the case of synchronous clocks, except that the cache read address RADDR[5. .2] is now compared with the state of the burst counter 216 instead of the cache write-address counter 215.

When the microprocessor 101 has issued an active-cache read request, and the address latch 203b has captured bit 23 of bus 102m, if this bit is cleared and RADDR[5. .2] has the value $1011_2$, the microprocessor is requesting a read of the checksum register 214. This is accomplished by selecting the checksum register 214 on multiplexer 212 when this condition is true.

In some embodiments, the address latches 203a, 203b, the SM word counter 208, the burst counter 216, the CPU write data register 205, a portion of the control circuit 209, and the read address changes of memory 201 are referenced with respect to the clock MCLK. The remaining clocked portions of the cache 200, including the write address changes of memory 201, are referenced with respect to the clock SMCLK.

The Appendix attached hereto illustrates PLD equations, written in Abel, of PLD module smctl1 clocked by the clock MCLK and of PLD module smctl2 clocked by the clock SMCLK. The two modules incorporate the counters 216, 208 and a portion of the control circuit 209.

MICROPROCESSOR SOFTWARE OPERATIONS

Certain address and/or data bits in the requests are set up in a way that eliminates cache inconsistency and minimizes cache misses, as will now be described.

The microprocessor determines, by conventional means, the starting address, HA, in shared memory of a block of data such as a packet header. This block of data has a certain number of data words, WC. WC is in the range 1 through 16. The maximum of 16 corresponds to the size of the cache memory 201 in some embodiments. However, 1-word blocks are not normally encached because they can be read more efficiently without being encached.

In order to encache the desired block, the microprocessor performs a write operation to the hexadecimal virtual address A9ppsss0$_{16}$. The program controlling the microprocessor is written in some embodiments in the C programming language which allows specifying virtual addresses explicitly. As described earlier, pp is used as a process identifier. The most significant bit of pp is used to select the checksum register during a read-data request, and the seven remaining bits are unused by the active cache. So, 128 process identifiers can be obtained using these seven bits. Each different software process uses a pair of these identifiers, 00 and 01 for the first process, 02 and 03 for the second, and so on, for 64 possible processes.

Note that if a process is going to set the most significant bit of pp to select the checksum register during a read-data request immediately following an encache-data request, then it will also set that bit during the encache-data request. This will allow the read-data request to use the same physical address on bus 102 as the encache-data request and thus will force the microprocessor to flush its write buffer before the read. This bit is ignored in the rest of this discussion.

Each process alternates which of its process identifiers to use on each successive encache-data request. For example, the first process uses pp=00 on its first request, pp=01 on its second request, pp=00 on its third request, and so on. This discipline ensures that successive encache-data requests, even when made by the same process, will be made to different hexadecimal addresses. As will be seen, this, in turn, guarantees that a read-data request made after a new encache-data request will cause a miss in the microprocessor's internal data cache, forcing the microprocessor to fetch newly-encached data from the active cache.

Also as described earlier, the bits sss in the address portion of the encache-data request are not used by the active cache. However, they may be chosen in a way that minimize misses in the microprocessor's internal data cache. In particular, these bits determine the line or lines of the microprocessor's internal data cache into which data from a read-data request will be encached. The line or lines may be chosen in a way to minimize internal misses. For example, the software may allocate a "dummy" 16-word data structure, aligned on a cache line, at or near the top of its run-time stack, and choose the sss bits so that a read-data request uses the same cache line(s) as the dummy data structure. In this way, a read-data request is guaranteed not to cause any useful run-time-stack data to be overwritten in the microprocessor's internal cache, as long as the internal cache is big enough to hold the top of the entire run-time stack. Likewise, program read and write operations near the top of the run-time stack (which are likely) will not overwrite internally encached results of a read-data request. The number of sss bits is such that an optimal value of the sss bits can be selected for a microprocessor internal data cache as large as 64K ($2^{16}$) bytes.

As described earlier, the data value for the encache-data request is vwmmmmmm$_{16}$ where mmmmmm is the shared memory address of the first word to be encached and the five low-order bits of vw contain the word count WC, with a valid range of 1–16.

Since the 3052 microprocessor used in some embodiments contains a "write buffer", the write operation may be delayed, since the microprocessor's internal bus controller gives read operations priority over write operations. In normal operation there is no assurance that a given write operation will be completed before a subsequent read operation is performed on the bus. It is therefore important to ensure that an encache-data request (a write operation) has been received by the active cache before a subsequent, corresponding read-data request is received. The conventional means of forcing a write to occur before a read is through a separate "write-buffer-flush" operation. In the present invention, the same effect is obtained automatically as a side effect of the read-data request, as will now be explained.

The first read-data request after an encache-data request is made to the hexadecimal virtual address 89ppSSS0$_{16}$, using the same value of ppsss that was used in the corresponding encache-data request. In the 3052 microprocessor of some embodiments, both virtual addresses A9ppsss0$_{16}$ and 89ppsss0$_{56}$ map into the same physical address, 09ppsss0$_{16}$. The write buffer recognizes this equivalence. If a read operation is requested at the same physical address as a pending write, the write buffer defers the read operation until the pending write has been completed. Therefore, no explicit write-buffer-flush operation is required. Successive read-data requests can be made to any address in the active cache's address space. The active cache's control circuit 209 will throttle such read operations (using RDCEN) as described previously if the requested data has not been encached.

In the typical use of the active cache, the two low-order bits of sss will be 0, so that the dummy data structure mentioned previously will be aligned on a 64-byte (16-word) boundary, corresponding to the size of the cache memory 201, and the first read-data request will be for the first word in the cache memory 201.

In practice, the software for the microprocessor 101 is written so that the starting address HA of a block of data to be encached is determined as early as possible and the encache-data request is made as soon as possible. The software is further written so that as many other computations as possible are performed by the microprocessor before a corresponding read-data request is made. This is done to maximize the probability that the encache-data request has been received by the active cache and that the first group of 4 words from the shared memory has been encached before the read-data request is made.

Three features of the invention enhance the ability of the microprocessor to continue performing computations while data is being encached by the active cache. First, the encache-data request is made by a write operation, which does not stall the microprocessor 101's internal pipeline unless the write buffer is full. Second, the microprocessor's address/data bus 102 is freed for other operations such as reading or writing private memory as soon as the encache-data request has been received by the active cache 200. Third, in some embodiments, the microprocessor is allowed to perform ordinary, direct read and write operations to the shared memory 104 even while an encache-data request is being satisfied. The control means 209 gives higher priority to such operations than to shared-memory read operations that encache data into the cache memory 201.

While the invention has been illustrated with respect to the embodiments described above, the invention is not limited thereto. The invention is not limited by a particular type of microprocessor, memory, or cache components. In some embodiments, different-type microprocessors with identical or different active cache systems share a memory. Other embodiments and variations are within the scope of the invention, as defined by the appended claims.

I claim:

1. A method for caching data from a random access memory, the method comprising:
    a processor executing a store instruction to generate output signals that include a store instruction write address and store instruction write data;
    a decoding circuit decoding at least a portion of the store instruction output signals to determine whether the store instruction is an encache-data request issued in the form of a store instruction wherein the encache-data request is not a request to write any data provided in the request;
    in response to the decoding circuit indicating that the store instruction is an encache-data request, reading data from the random access memory into a cache memory independently of the processor.

2. The method of claim 1 wherein when the store instruction is an encache-data request issued in the form of a store instruction, the output signals of the store instruction encode an address in the random access memory, and the data reading comprises reading data at said address.

3. An active cache for caching data for a random access memory and providing cached data to a computer processor, the active cache comprising;
    a first circuit for determining whether signals generated by a processor indicate a write request, and whether the write request is an encache-data request issued in the form of a write request, wherein the encache-data request is not a request to write any data provided in the request; and
    a second circuit for reading data from the random access memory into a cache memory independently of the processor when the first circuit indicates an encache-data request.

4. The active cache of claim 3 wherein a write request includes a write address portion and a write data portion, and in the encache-data request the write address portion and the write data portion encode: (1) a block read address which is an address of a data block in the random access memory, wherein the data block is to be read by the second circuit to satisfy the encache-data request, and (2) a block count specifying the length of the data block.

5. The active cache of claim 4 wherein the second circuit comprises circuitry for performing a burst read operation to read from the random access memory a length of data specified by the block count.

6. The active cache of claim 4 wherein the second circuit comprises circuitry to perform one or more burst read operations of a predetermined length to read the data block from the random access memory.

7. The active cache of claim 6 wherein if the data length specified by the block count is not a multiple of the predetermined length, the circuitry is to perform as many predetermined-length burst read operations to read the data block as possible without exceeding the block count, and the second circuit is to perform non-burst read operations for the data block portion not read by the predetermined-length burst operations.

8. The active cache of claim 6 wherein if the data length specified by the block count is not a multiple of the predetermined length, the circuitry is to perform as many predetermined-length burst read operations as needed to read the data block, but the second circuit is not to store in the cache memory the data which is not part of the data block.

9. The active cache of claim 6 wherein the predetermined length is four words.

10. The active cache of claim 6 wherein the data block read address does not have to be a multiple of the predetermined length.

11. The active cache of claim 4 wherein the second circuit comprises a parameter capture circuit for capturing at least a portion of the block read address and count from the write address and the write data when the first circuit indicates an encache-data request.

12. The active cache of claim 11 wherein the parameter capture circuit is to capture the entire block read address and the entire block count.

13. The active cache of claim 4 wherein the processor includes an input for receiving a ready signal indicating that a write operation requested by a write request is complete; and.
    the second circuit includes circuitry for asserting a ready signal in response to the encache-data request before the data block has been written to the cache memory.

14. The active cache of claim 4 wherein the active cache permits the processor to access the random access memory after making the encache-data request before all the data to be read to satisfy the encache-data request has been written to the cache memory.

15. The active cache of claim 4 wherein the random access memory and the processor's bus for accessing memory use different clock frequencies.

16. The active cache of claim 4 in combination with the processor, wherein the processor has an internal cache, and wherein the block read address does not have to be aligned with respect to the cache-line size of the internal cache.

17. The active cache of claim 4 wherein the processor has an internal cache, and the block read address does not have to be a multiple of the cache line size of the internal cache.

18. The active cache of claim 3 wherein the processor includes an input for receiving a ready signal indicating that a write operation requested by a write request is complete; and
    the second circuit includes circuitry for asserting a ready signal in response to the encache-data request before the data block has been written to the cache memory.

19. The active cache of claim 3 wherein the active cache permits the processor to access the random access memory after making the encache-data request before all the data to be read to satisfy the encache-data request has been written to the cache memory.

20. The active cache of claim 3 wherein the random access memory and the processor's bus for accessing memory use different clock frequencies.

21. The active cache of claim 20 wherein the clock frequency used by the bus is greater than the clock frequency used by the random access memory.

22. The active cache of claim 3 in combination with the random access memory wherein the random access memory is a shared memory having a plurality of ports.

23. The active cache of claim 3 wherein:
the first circuit comprises circuitry to determine whether signals generated by the processor indicate a read request, and whether the read request is a read-encached-data request; and
the second circuit comprises circuitry to provide encached data to the processor when the first circuit indicates a read-encached-data request.

24. The active cache of claim 23 in combination with the processor, wherein the processor comprises circuitry for mapping virtual addresses to physical addresses and for providing the physical addresses as part of the read and write requests, and
wherein the processor uses a virtual address V1 in a store instruction which generates an encache-data request, and the processor uses a different virtual address V2 in a load instruction which generates a read-encached-data request.

25. A combination of the active cache and the processor as recited in claim 5 wherein the processor comprises an internal cache, and the processor interprets virtual address V1 as non-cacheable in the internal cache, and interprets virtual address V2 as cacheable in the internal cache.

26. The combination of claim 24 wherein the virtual addresses V1 and V2 are mapped into the same physical address by the mapping circuitry.

27. The combination of claim 24 wherein the processor comprises a write buffer to enable the processor to buffer one or more write operations before issuing corresponding write requests and in particular to enable the processor to give read operations priority over write operations, but a load instruction from virtual address V2 following a store instruction to virtual address V1 forces the processor to issue the write request corresponding to address V1 before issuing the read request corresponding to address V2.

28. The active cache of claim 23 wherein in response to a read-encached-data request the second circuit is to provide a burst of data to the processor.

29. The active cache of claim 23 wherein the first circuit does not use one or more bits of read addresses in the read-encached-data requests, thus enabling the processor to read particular data from the cache memory using any values of the one or more bits.

30. The active cache of claim 31 in combination with the processor, wherein the processor has an internal cache, and data are placed into the internal cache based on the one or more bits in data addresses, thus enabling one to define values of the one or more bits for encache-data and read-encached-data requests to reduce misses in the internal cache.

31. The active cache of claim 29 in combination with the processor, wherein the processor has an internal cache, and there exists a read address for a read-encached-data request such that said read address causes a cache miss in the internal cache on the read-encached-data request following an encache-data request.

32. The active cache of claim 3 wherein the second circuit comprises circuitry for determining a checksum of at least a portion of data read into the cache memory.

33. The active cache of claim 32 wherein the checksum determining circuitry comprises circuitry to select said at least a portion of data for which the checksum is to be determined.

34. The active cache of claim 32 wherein the second circuit is to read data words from the random access memory into the cache memory, and the checksum determining circuitry comprises circuitry to select individual halfwords to define said at least a portion of data for which the checksum is to be determined.

35. The active cache of claim 32 wherein the second circuit is to read data words from the random access memory into the cache memory, each data word comprising a plurality of bytes, and the checksum determining circuitry comprises circuitry to select individual bytes to define said at least a portion of data for which the checksum is to be determined.

36. The active cache of claim 32 wherein the checksum determining circuitry comprises a ones'-complement adder for determining the checksum.

37. The active cache of claim 32 wherein the checksum is a CRC (cyclic redundancy check) checksum.

38. The active cache of claim 32 wherein a checksum function for the checksum is determined from the encache-data request.

39. The active cache of claim 32 wherein the checksum determining circuitry comprises circuitry to determine a checksum function for the checksum from the data read into the cache memory.

40. The active cache of claim 32 wherein the checksum determining circuitry comprises circuitry to determine a plurality of checksums for the same data read into the cache memory.

41. The active cache of claim 32 wherein a read-encached-data request comprises a parameter to indicate that the read-encached-data request comprises a request to read a checksum, and the second circuit comprises circuitry to provide the checksum to the processor in response to a request to read a checksum.

42. The active cache of claim 3 wherein the encache-data request encodes an address in the random access memory, wherein the second circuit is to read data at said address from the random access memory into the cache memory when the first circuit indicates an encache-data request.

43. A computer readable medium comprising a store instruction to cause a computer processor to issue a write request to be interpreted by an active cache as an encache-data request which is a request to read data from a random access memory into the active cache the write request not to be interpreted to write any data provided in the write request.

44. The computer readable medium of claim 43 wherein the store instruction includes a store address and store data to cause the write request to include a write address and write data which encode: (1) a block address which is an address of a data block in the random access memory, wherein the data block is to be read to satisfy the encache-data request, and (2) a block count specifying the length of the data block.

45. The computer readable medium of claim 43 further comprising a load instruction to cause the processor to issue a read request to be interpreted by the active cache as a read-encached-data request which is a request to read data from the active cache to the processor.

46. The computer readable medium of claim 45 wherein the load instruction includes a load address to cause the read request to include a read address which encodes an address in the active cache from which address the data are to be read to the processor.

47. The computer readable medium of claim 46 wherein:

the store instruction includes a store address and store data to cause the write request to encode a block address which is a n address of a data block in the random access memory, wherein the data block is to be read by the active cache to satisfy the encache-data request;

the load instruction is to read from the active cache at least a portion of the data read into the active cache by the store instruction; and the store address and the load address are virtual addresses that the processor is to map into physical addresses.

48. The computer readable medium of claim 47 wherein the processor comprises an internal cache, and store address is cacheable in the internal cache, and the load address is noncacheable in the internal cache.

49. The computer readable medium of claim 47 wherein the store and load addresses are mapped into the same physical address by the processor.

50. The computer readable medium of claim 47 wherein the processor comprises a write buffer to enable the processor to buffer one or more write operations before issuing corresponding write requests and in particular to enable the processor to give read operations priority over write operations, but the load instruction forces the processor to issue the write request corresponding to the store address before issuing the read request corresponding to the load address.

51. The computer readable medium of claim 46 wherein:

the active cache does not use one or more bits of read addresses in the read-encached-data requests, thus enabling the processor to read particular data from the cache memory using any values of the one or more bits;

the processor has an internal cache, and data are placed into the internal cache based on one or more of the one or more bits in data addresses;

the computer readable medium includes a program having means to allocate a dummy structure within a data storage area of the program; and the one or more bits in the load request are chosen so that the read-encached-data request uses the same area in the internal cache as the dummy structure, so that: (1) the read-encached-data request will not overwrite an internal cache area for caching non-dummy data from the data storage area, and (2) an access to said non-dummy data will not overwrite an internal cache area for caching the data read by the read-encached-data request.

52. The computer readable medium of claim 51 wherein the data storage area comprises at least a portion of a run-time stack.

53. The computer readable medium of claim 52 wherein the dummy structure is allocated at or near the top of the run-time stack.

54. The computer readable medium of claim 45 wherein the processor has an internal cache, and the load address is to follow the store instruction and to cause a cache miss in the internal cache.

55. The computer readable medium of claim 45 wherein the load instruction comprises a parameter to indicate a request to read a checksum of at least a portion of data in the active cache.

56. The computer readable medium of claim 43 wherein the store instruction specifies a checksum function to be used by the active cache to determine a checksum of at least a portion of data read into the active cache.

57. The computer readable medium of claim 43 wherein the encache-data request includes an address in the random access memory, and data is to be read at said address to satisfy the encache-data request.

* * * * *

UNITED STATES PATENT AND TRADEMARK OFFICE
CERTIFICATE OF CORRECTION

PATENT NO.    : 5,875,466
ISSUE DATE    : February 23, 1999
INVENTOR(S)   : Wakerly, John F.

It is certified that error appears in the above-identified patent and that said Letters Patent is hereby corrected as shown below:

Column 2, line 5
    delete "5,575,376" and insert --5,515,376--

Signed and Sealed this

First Day of May, 2001

Attest:

NICHOLAS P. GODICI

*Attesting Officer*    *Acting Director of the United States Patent and Trademark Office*